Jan. 29, 1957

S. BARKER 2,779,476

TESTING MECHANISM FOR CREAM

Filed Dec. 10, 1954

INVENTOR.
Stacey Barker
BY Arthur H. Sturges
Attorney

Jan. 29, 1957  S. BARKER  2,779,476
TESTING MECHANISM FOR CREAM
Filed Dec. 10, 1954  2 Sheets-Sheet 2

INVENTOR.
Stacey Barker
BY Arthur H. Sturges
Attorney

United States Patent Office 2,779,476
Patented Jan. 29, 1957

2,779,476

TESTING MECHANISM FOR CREAM

Stacey Barker, Aurora, Nebr.

Application December 10, 1954, Serial No. 474,447

4 Claims. (Cl. 210—150)

This invention relates to devices for processing and testing dairy products, and particularly cream, and in particular mechanical apparatus through which cream is adapted to be passed whereby the amount of sediment in cream may readily be determined and wherein a quantity of cream in which the sediment content exceeds a predetermined amount may be rejected for reprocessing whereas, in the same apparatus, a quantity of cream in which the sediment content is substantially zero may be passed for bottling, or packaging, or for use in the manufacture of dairy products.

The purpose of this invention is to provide means whereby quantities of cream in which the sediment content exceeds a predetermined amount may readily be rejected.

It is generally known that in all fluids, and particularly dairy products, there is the possibility of the existence of some foreign matter, which settles to the bottom, and may be referred to as sediment. In manufacturing some dairy products, such as butter, sediment, and other foreign matter is very objectionable, and with conventional manufacturing processes such sediment is difficult to eliminate.

With this thought in mind this invention contemplates a plurality of containers or tubs having sediment removing screens in outlet openings thereof, a temporary receptacle into which cream from the tubs may be pumped and from which cream may be, selectively, run into additional filtering or screening means, or deposited into a container from which it may be pumped into bottles or packages, or used for manufacturing dairy products.

The object of this invention is, therefore, to provide cream treating apparatus through which cream may be rapidly passed and in which the sediment content of the cream may readily be ascertained.

Another object of the invention is to provide cream treating apparatus in which, after ascertaining the sediment content in the cream, the cream may be rejected for further processing, or run into a vat or container for use.

Another important object of the invention is to provide a device for determining the amount of sediment in cream in which the cream of one tub may be pumped into containers for use or rejection as cream is poured from a can, such as a ten gallon milk can, into another tub.

A further object of the invention is to provide a device for ascertaining the amount of sediment in cream in which a sediment arresting screen is adapted to be readily removed and cleaned.

A still further object is to provide apparatus for testing cream to determine the sediment content therein in which the apparatus is of simple and economical construction.

With these and other objects and advantages in view the invention embodies a plurality of tubs having sediment arresting strainers in outlet openings thereof mounted to rotate on a frustro-conical shaped valve body, tubes extended from the outlet openings of the tubs to the valve body, said valve body having a core with a single passage therethrough, a receptacle for receiving cream from the tubs, a pump for drawing cream from the passage of the core of the valve body and depositing the cream into the receptacle, an outlet connection for retaining cream in the receptacle or for running the cream from the receptacle, a container for receiving cream from the receptacle, and a pump for supplying cream from the container to bottling, packaging, or manufacturing equipment.

Other features and advantages of the invention will appear from the following description taken in connection with the drawings, wherein.

Figure 1:
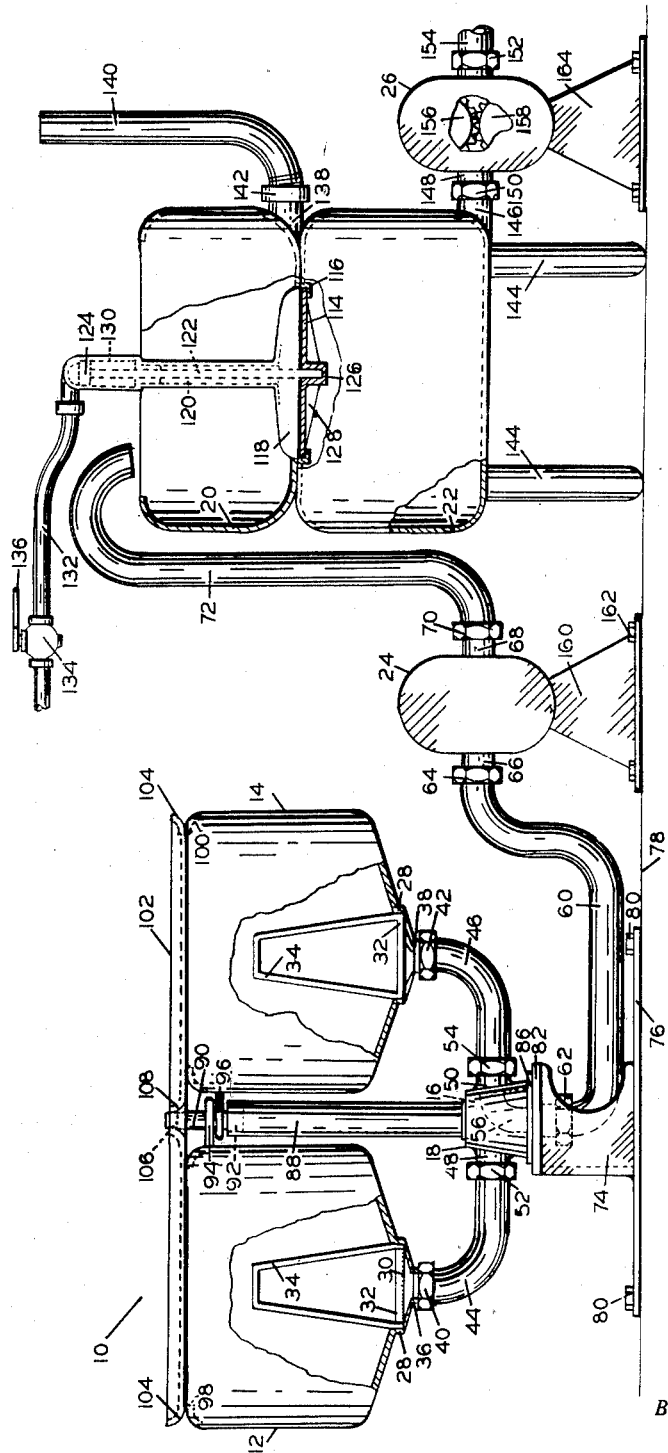
Figure 1 is a side elevational view of the cream testing apparatus showing the cream receiving tubs, receptacle, container, pumps, and connections with the parts assembled for use and with parts broken and other parts shown in section.
Figure 2:
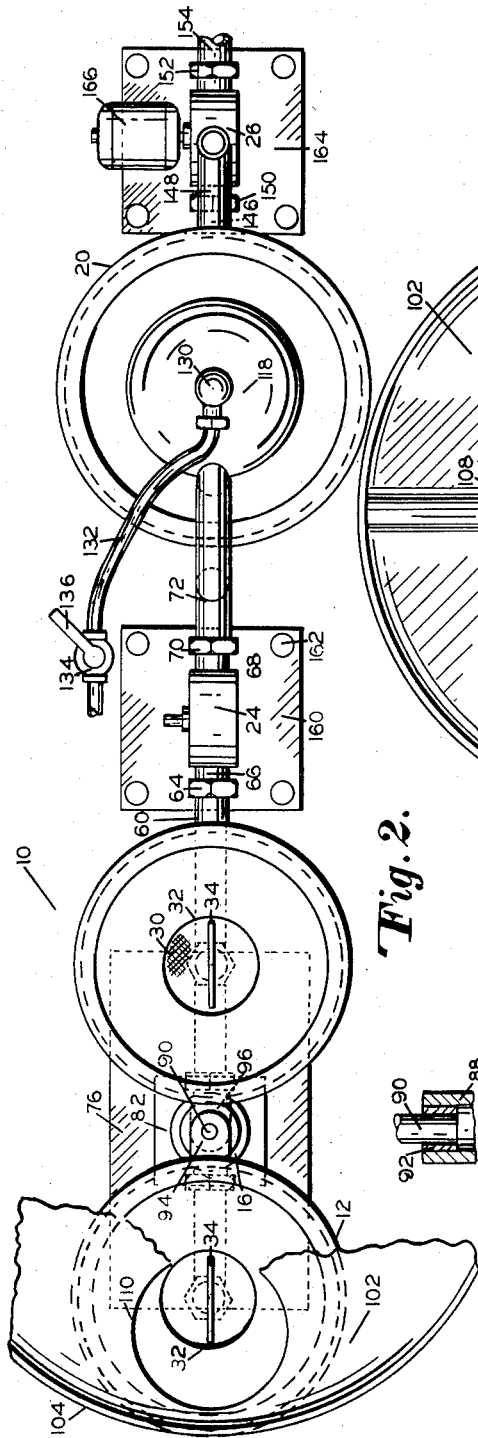
Figure 2 is a plan view of the cream testing apparatus showing the parts assembled, as in Figure 1, and also with parts broken away.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 tubs or containers adapted to receive ten gallons of cream each, numeral 16 a valve body adapted to rotate on a core 18, numeral 20 a receptacle for receiving cream from one of the tubs, numeral 22 a container for receiving cream from the receptacle 20, numeral 24 a pump for withdrawing cream from a tub and depositing the cream in the receptacle, and numeral 26 a pump for removing cream from the container and supplying the cream to bottling or packaging means, or to a manufacturing plant or the like for converting the cream into products.

The tubs are provided with cylindrical walls and sloping lower surfaces, or bottoms, and each tub is formed with an annular neck 28 in which a screen 30 mounted in a ring 32 and provided with a handle 34 is positioned. With the screens mounted in this manner they may readily be removed after the cream is pumped from the tub to determine the amount of sediment in a quantity, such as ten gallons, of cream.

The lower ends of the tubs are formed with threaded nipples 36 and 38 on which coupling nuts 40 and 42 are threaded for securing the upper ends of tubes 44 and 46, respectively, to the nipples and lower ends of the tubs. The lower ends of the tubes are secured to threaded nipples 48 and 50 which extend from the valve body 16 with couplings 52 and 54.

Although only two of the tubs and connecting tubes are illustrated in the drawing, it will be understood that the device may be provided with three, or any suitable number of the tubs, and a corresponding number of tubes may be provided for connecting the tubs to the valve body.

The valve core 18 is provided with a single L-shaped passage 56, the upper end of which is positioned to register with the openings of the nipples 48 and 50, and the lower end of which extends through a nipple 58 to which a tube 60 is connected with a coupling 62, and the opposite end of the tube 60 is connected by a coupling 64 to a nipple 66 on the suction side of the pump 24. A nipple 68 on the discharge side of the pump is connected by a coupling 70 to a tube 72, having a goose-neck formation on the upper end, the upper end being positioned to discharge into the receptacle 20.

The valve core 18 is supported on a bracket 74 having a base 76 that is secured to a foundation or floor 78 with bolts 80, and the core is secured to an upper horizontal panel 82 with bolts 84. The bolts 84 extend through laminated shims 86 positioned between the lower end of the core and the panel 82, and an upper shim is adapted to be peeled off to insure a sealed fit between the valve core and body 16.

Figure 4:
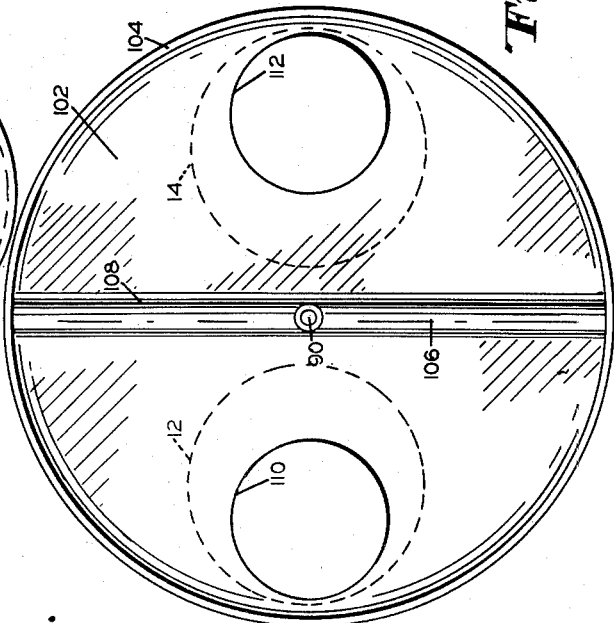
Figure 4 is a plan view of a splash guard adapted to be positioned over the tubs.
Figure 3:
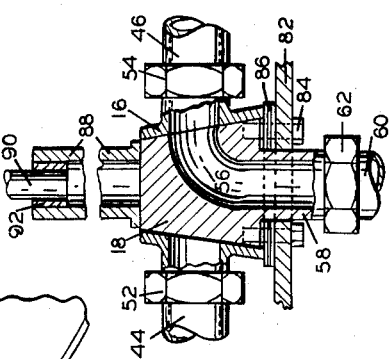
Figure 3 is a vertical section through the swivel valve assembly to which the tubs are connected, the parts being shown on an enlarged scale.

The upper end of the valve core 18 is provided with a vertically positioned tubular shaft 88, a flanged lower end of which is secured to the core, such as by welding, and the upper end of the shaft is provided with a stem 90 that is secured in the end of the shaft with a bushing 92, and, as shown in Figure 1, the stem extends through eyes on the sides of the tubs to permit the tubs to rotate around the shaft. The eye extended from the tub 12 is indicated by the numeral 94 and the eye extended from the tub 14 by the numeral 96. The upper edges of the tubs 12 and 14 are provided with arcuate inwardly extended flanges 98 and 100, respectively, and a splash guard 102, as shown in Figure 4, is positioned on the flanges of the tubs to prevent cream being poured into the tubs splashing over the sides and spilling on the equipment and floor. The splash guard 102 is provided with an annular upwardly extended arcuate peripheral flange 104, and a partition 106 extends across the center to separate the cream for the tubs. The center of the splash guard is also provided with an arcuate boss or flange 108 in which the upper end of the stem 90 is held. The splash guard is also provided with an opening 110 that is positioned over the tub 12, and a similar opening 112 that is positioned over the tub 14, and these openings are of sufficient size to permit the screens 30 to be withdrawn by the handles 34, after cream is pumped from the tubs to examine the sediment content of the cream.

The upper end of the container 22 is provided with an opening 114 around which an annular flange 116 is positioned and a valve head 118 carried by a tube 120 provides a closure for the opening. The valve head is positioned around a piston rod 122 extended from a piston 124, and the lower end of the piston rod is secured in a hub 126 of a spider 128 which is secured to the flange 116. The tube 120 extends from a cylinder 130 in which the piston 124 is positioned and with air under pressure supplied to the upper end of the cylinder through a tube 132 the cylinder with the valve head 118 moves upwardly opening the passage between the receptacle 20 and the container 22 whereby the cream is deposited into the container. The tube 132 is provided with a control valve 134 having a handle 136 whereby the valve is adapted to be manually actuated as desired.

The lower part of the receptacle 20 is provided with a nipple 138 and an outlet tube 140 is connected to the nipple 138 with a swivel coupling 142 whereby the tube 140 is adapted to be turned upwardly, as shown in Figure 1, to retain cream in the receptacle, and when the sediment content of the cream exceeds a predetermined amount the tube 140 is turned downwardly to run the cream back into a milk can or into devices for removing the sediment or for further treating or purifying the cream.

The container 22, which is mounted on legs 144 is provided with an outlet nipple 146 to which an intake connection 148 of the pump 26 is connected by a coupling 150, and the discharge side of the pump is connected by a coupling 152 to a tube or pipe 154 from which cream in which the sediment content is below a predetermined amount may be pumped for bottling, packaging, or for use in manufacturing dairy products, such as butter and the like.

The pumps 24 and 26 may be of the gear type having gears 156 and 158, as shown in the broken away portion of the pump 26, or pumps of any other suitable type may be used.

The pump 24 is mounted on a stand 160 which is secured to the floor 78 with bolts 162, and the pump 26 is mounted on a similar stand 164 which may be secured to the floor in a similar manner. The pump 26 may be driven by a motor, such as the motor 166, or by other suitable means.

With the parts designed and assembled as shown and described a ten gallon can of cream is poured into the tub 12, and after settling, the tubs are rotated until the opening of the nipple 48 registers with the opening through the valve core 18, at which time the pump 24 is started and as cream is pumped from the tub 12 another can of cream is poured into the tub 14. The cream from the tub 12 is pumped into the receptacle 20 and after all of the cream is removed from the tub 12 the screen 30 is removed by the handle 34 and the amount of sediment on the screen readily observed.

Should the cream be free of sediment, or should the amount of the sediment be comparatively small, the valve 134 is opened whereby air under pressure is admitted to the upper end of the cylinder 130 whereby the cylinder moves upwardly, as shown by the dotted lines, drawing the valve head 118 upwardly and opening the lower end of the receptacle whereby the cream is deposited into the container 22, from which it is pumped for use. Should the sediment be more than a predetermined amount, the tube 140 is turned downwardly and the cream run into means for reprocessing.

The cycle of operations is repeated for the cream of the tub 14, or for cream of as many tubs as may be desired, and by this means any quantity of cream may be run through the testing apparatus in a comparatively short time.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed, may be resorted to, in actual practice, if desired.

Having now described the invention that which is claimed to be new and desired to be procured by Letters Patent, is:

1. A cream testing device comprising a bracket, a valve core having a passage therethrough, said valve core being mounted on the bracket, a valve body having a plurality of nipples extended therefrom rotatably mounted on said valve core, a plurality of tubs suspended from said valve core and having outlet openings in lower ends thereof, tubes connecting the outlet openings of the tubs to the nipples of the valve body, removable sediment collecting screens positioned in said outlet openings of the tubs, a receptacle for temporarily retaining cream, means for pumping cream from the tubs to the receptacle, a container positioned to receive cream from the receptacle, means for passing cream from the receptacle to the container for use, and means for passing cream from the receptacle to reprocessing means.

2. In a cream treating device, the combination which comprises a supporting bracket, a valve core having an L-shaped passage therethrough and having a tubular shaft with a stem on the upper end extended upwardly therefrom, a valve body having nipples extended therefrom rotatably mounted on said valve core, a plurality of tubs positioned at the sides of the tubular shaft and having eyes on the upper portions, said eyes being positioned on the stem extended from the tubular shaft, a splash guard positioned on the upper ends of the tubs, said tubs having outlet openings in lower ends thereof, sediment collecting screens positioned in said outlet openings of the tubs, handles on said screens, a receptacle having an opening in the lower end and a nipple extended from one side, a tube connected to said nipple of the receptacle with a swivel coupling and adapted to extend upwardly to retain cream in the receptacle, a valve head positioned in the opening in the lower end of the receptacle, a fluid pressure actuated cylinder for actuating said valve head to open said opening, a container having an outlet nipple on one side positioned to receive cream from the outlet opening of the receptacle, a pump for pumping cream from the valve core to the receptacle, and a pump connected to the nipple of the container.

3. In cream testing apparatus, the combination which comprises a valve core having an L-shaped passage therethrough and having a vertically disposed shaft extended upwardly from the upper end, a valve body having nipples extended from sides thereof rotatably mounted on said valve core, said vertically disposed shaft having a stem extended upwardly from the upper end, tubs having eyes spaced from upper ends thereof and outlet openings with screens therein in the lower ends positioned at the sides of the vertically disposed shaft, the eyes of the tubs being positioned over said stem, and the outlet openings in the lower ends of the tubs being connected with tubes to the nipples of the valve body, means for supporting the valve core and body, a receptacle having an open upper end and an opening in the lower end, a tube having a pump therein extended from the lower end of the passage through the valve core to a point above said receptacle, a container positioned below the receptacle, a valve head adapted to close the opening in the lower end of the receptacle, a fluid pressure cylinder positioned to actuate the valve head, means for applying fluid under pressure to the cylinder to actuate the valve head to open the opening in the lower end of the receptacle, a nipple extended from the lower part of the receptacle, a tube connected to the nipple of the receptacle with a swivel coupling whereby the tube is adapted to extend upwardly to retain fluid in the receptacle or to be positioned downwardly to run fluid from the receptacle, a nipple extended from the lower end of the container, and a pump connected to the nipple extended from the lower end of the container for pumping cream from the container for use.

4. In a cream tester, the combination which comprises a plurality of containers each having a vertically disposed cylindrical wall with a sloping bottom and with a threaded nipple extended from a low point of the bottom, a vertically positioned shaft, means for rotatably mounting the containers on the shaft, a splash guard positioned over the containers and having openings providing communicating means with the containers, a valve body having a vertically disposed axis and having threaded nipples extended from sides thereof, tubes connecting the threaded nipples of the containers to the threaded nipples of the valve body, screens positioned in the containers and mounted in annular recesses at inner ends of the threaded nipples, a valve core having an L-shaped opening therethrough positioned with one section of the opening adapted to register, alternately, with openings of the threaded nipples of the valve body, said valve core being rotatably mounted in the valve body, a receptacle having an opening in the lower part thereof, a connection having a pump therein extended from the L-shaped opening of the valve core to the receptacle, a container mounted below the receptacle and positioned to receive cream from the opening in the lower part of the receptacle, a valve in the opening in the lower part of the receptacle, means for opening the valve in the opening in the lower part of the receptacle from a remote point, an outlet tube mounted with a swivel connection on the lower part of the receptacle, and a pump positioned with the intake thereof connected to the lower part of the container below the receptacle.

References Cited in the file of this patent

UNITED STATES PATENTS

| | | |
|---|---|---|
| 1,185,531 | Pfouts | May 30, 1916 |
| 1,330,994 | Winkley | Feb. 17, 1920 |
| 1,360,869 | Beliveau | Nov. 30, 1920 |
| 2,462,595 | Benedict | Feb. 22, 1949 |

FOREIGN PATENTS

| | | |
|---|---|---|
| 530,973 | Great Britain | Dec. 27, 1940 |